United States Patent Office 3,646,079
Patented Feb. 29, 1972

3,646,079
PREPARATION OF RHODIUM COMPLEXES
Malcolm J. Lawrenson, Twickenham, Middlesex, England, assignor to The British Petroleum Company Limited, London, England
No Drawing. Filed Feb. 7, 1969, Ser. No. 797,685
Claims priority, application Great Britain, Feb. 7, 1968, 6,112/68
Int. Cl. C07j *15/00*
U.S. Cl. 260—429 J
9 Claims

ABSTRACT OF THE DISCLOSURE

Rhodium complexes are made by reacting a rhodium carbonyl carboxylate with a reagent (other than a hydrogen halide) containing an active hydrogen atom. Acetyl acetonates and similar compounds are preferred.

---

The present invention relates to the preparation of rhodium complexes.

In our copending application Ser. No. 779,433, filed November 27, 1968, we describe a process for the hydroformylation of olefins using a complex containing a bidentate ligand. The preferred complexes were ketoenolates or Schiff's bases of rhodium which also contained a carbonyl group and a biphyllic ligand containing, preferably, phosphorus, arsenic or antimony.

Previously two methods were known for making such complexes. One was by reacting rhodium carbonyl chloride dimer with, for example, acetylacetone (Hacac) in the presence of barium carbonate. This is reported in the Journal of the Chemical Society 1964 Part III pp. 3156 to 3160.

The reaction is:

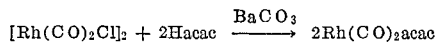

$$[\mathrm{Rh(CO)_2Cl}]_2 + 2\mathrm{Hacac} \xrightarrow{\mathrm{BaCO_3}} 2\mathrm{Rh(CO)_2acac}$$

91% yield is given with acetylacetone, although the reaction time is 120 hours but using benzoylacetone only 16% yield is obtained and dibenzoylmethane gives no product.

The alternative method is to react rhodium trichloride with acetylacetone in dimethylformamide (Zhur. Neorg. Khim, 1967, 12, 1709) but only a 61% yield is obtained.

We have now found a general method of wide application for the preparation of rhodium complexes, particularly of the type described above, in good yield easily and quickly.

Thus, according to the present inventon there is provided a process for the preparation of rhodium complexes which process comprises reacting a rhodium carbonyl carboxylic with a reagent other than a hydrogen halide containing at least one active hydrogen atom.

The preferred reagents are beta-diketones and Schiff's bases derived from them.

Any convenient beta-diketone or beta-ketoimine may be used. The following are suitable: acetylacetone, dibenzoylmethane, benzoylacetone, dipivaloylmethane, diisobutyrylmethane, trifluoroacetylacetone, hexafluoroacetylacetone, 3-allyl-2,4-pentanedione, and other 3-substituted - 2,4 - pentanediones and benzoyltrifluoroacetone. Beta-ketoimines of general formula RCOCHR'C:NR'''R'' where R, R', R'' and R''' may be any aliphatic or aromatic group are also suitable. R' and R''' may also be hydrogen.

The rhodium carbonyl carboxylate will normally be of the form $[\mathrm{Rh(CO)_2RCOO}]_2$ where R is an aliphatic, substituted aliphatic, aromatic or substituted aromatic group, preferably with less than 20 carbon atoms. The acetate, propionate, pivalate and isobutyrate are particularly preferred.

The preparation of the complexes is suitably carried out by mixing the carbonyl carboxylate with the appropriate reagent in an inert solvent, cooling if necessary to assist deposition of the product.

The solvent, may suitably be a paraffinic hydrocarbon such as pentane, hexane or heptane.

One carbonyl ligand of the product complex may be easily replaced by another neutral ligand to give a hydroformylation catalyst of the type described in our copending application Ser. No. 779,433.

Suitable neutral complexing ligands are molecules containing an atom of a Group V–B or VI–B element which has a single pair of electrons available for donation ($\delta$ donors), especially nitrogen or oxygen. Suitable nitrogen-donor ligands of this type include monoalkyl and monoarylamines, e.g. methylamine, ethylamine, n-propylamine, and similar dialkyl1, trialkyl- and triarylamines, e.g. dimethylamine, diphenylamine, trimethylamine and triphenylamine; diamines and triamines e.g. ethylenediamine, diethyltriamine; ammonia, hydroxylamine, and other neutral molecules of the form $\mathrm{NX_3}$, where X is any suitable group, are acceptable ligands. Suitable oxygen donors will be of the form $\mathrm{OX_2}$, e.g. ethers.

In addition, the donor atom may possess vacant orbitals supplementing the $\delta$-bonding by accepting electron density from filled metal orbitals ($\pi$-acceptors) such as phosphorus, arsenic, antimony or sulphur. Suitable ligands of this type will include phosphines, arsines, and stibines of general formula RR'R''D where R, R' and R'' are any alkyl or aryl groups and D is the donor atom and phosphites, arsenities and stibinites of general formula (RO)(R'O)(R''O)D; mercaptans RR'S; and sulphoxides RR'SO.

Other suitable molecules have delocalised $\pi$-orbitals and are able to absorb electron density from the metal orbitals into the $\pi^x$ antibonding orbitals of the ring system ($\pi^x$ acceptors). Such ligands include pyridine and substituted pyridines, e.g. α-piceline, 2,2'-dipyridyl, 1,10-phenanthrolene.

The preferred ligands are tertiary phosphines which ensure a large difference between the low energy and high energy $d$ orbitals of the metal since generally the most stable complexes are those in which this energy difference is greatest. More particularly the ligands may be triethylphosphine, tri-n-propylphosphine, tri-n-butylphosphine and tri-n-octylphosphine.

The invention is illustrated but not limited by the following examples:

EXAMPLE 1

0.95 g. rhodium carbonyl propionate, prepared from rhodium carbonyl chloride and twice the theoretical quantity of sodium propionate in petroleum ether, were dissolved in 25 ml. pentane and treated with 0.5 ml. acetylacetone. The mixture was stirred at room temperature for 30 minutes before filtering when 0.80 g. rhodium dicarbonyl acetylacetonate were obtained. A further 0.19 g. of product exhibiting the characteristic red-green dichroism of $\mathrm{Rh(CO)_2}$ acac were obtained on slow cooling. Total yield was 0.99 g. (94 percent).

EXAMPLE 2

0.70 g. rhodium dicarbonyl propionate in 25 ml. pentane were reacted with 0.82 g. benzoylacetone and the mixture stirred for 15 minutes. On cooling to −80° a red-brown complex was deposited. Yield was 0.93 g. (93 percent).

EXAMPLE 3

0.93 g. rhodium dicarbonylpropionate in 25 ml. pentane were reacted with 0.90 g. dibenzoylmethane and the mixture stirred for 15 minutes. The complex was precipitated on standing as light brown needles. Yield was 1.41 g. (97 percent).

Example 3 is the first report of the successful preparation of the dibenzoylmethane derivative. In addition all three examples show that such species may not only be prepared in good yield in short reaction periods, but that the large excesses of β-diketone used in other preparative routes are not necessary.

EXAMPLE 4

A suspension of 0.77 g. rhodium dicarbonyl propionate in 25 ml. pentane was mixed with a solution of 0.8 g. trifluoroacetylacetone in 15 ml. pentane and stirred for 25 minutes. On cooling to −80° C. a deep red solid was deposited which subsequently turned green. Vacuum sublimation of this material gave the pure product as wine-red crystals. The yield was 0.85 g. (80 percent of theory).

EXAMPLE 5

The hexafluoracetylacetone derivative was prepared as the trifluoroacetonate except that the reaction time was extended to 17 hours. Yield 0.81 g. (66 percent of theory).

EXAMPLE 6

The benzoyltrifluoroacetonate was prepared in a similar manner to the trifluoroacetylacetone derivative. On cooling to −80° C. the compound was obtained as crystals, yield 1.20 g. (96 percent of theory).

EXAMPLE 7

The dipivaloylmethane derivative was prepared by following the procedure of Example 4. After 2 hours the mixture was evaporated to dryness under vacuum to give the product, Yield was 0.87 g. (76 percent of theory).

EXAMPLE 8

A suspension of 0.93 g. rhodium dicarbonyl propionate in 40 ml. pentane was added to a solution of 1.12 g. 2-acetylcyclohexanone in 10 ml. pentane. After stirring for 1 hour the product was obtained by cooling to −80° C. The yield was 0.96 g. (81 percent of theory).

EXAMPLE 9

A suspension of 0.70 g. rhodium dicarbonyl propionate was stirred with 0.43 g. 3-methylacetylacetone in 10 ml. pentane for 2 days. After evaporation to dryness in vacuo and sublimation in vacuo the product was obtained as crystals. The yield was 0.49 g. (60 percent of theory).

I claim:

1. A process for the preparation of rhodium complexes of the formulae:

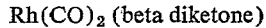

and

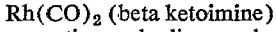

which comprises reacting a rhodium carbonyl carboxylate of the formula $[Rh(CO)_2RCOO]_2$ wherein R is an aliphatic or aromatic group with a beta diketone or a beta ketoimine.

2. Process according to claim 1 where the beta diketone is acetylacetone, dibenzoylmethane, benzoylacetone, dipivaloylmethane, di-isobutyrylmethane, trifluoroacetylacetone, hexafluoroacetylacetone, a 3-substituted-2,4,-pentanedione, or benzoyltrifluoroacetone.

3. A process according to claim 2 wherein the 3-substituted-2,4-pentanedione is 3-allyl-2,4-pentanedione.

4. Process according to claim 1 where the rhodium carbonyl carboxylate is reacted with a beta-ketoimine of the formula RCOCHR'C:NR'''R'' where R and R'' are selected from the group consisting of aliphatic and aromatic groups, and R' and R''' are selected from the group consisting of aliphatic and aromatic groups and hydrogen.

5. Process according to claim 1 where the group R contains less than 20 carbon atoms per molecule.

6. Process according to claim 5 where the carboxylate group is the acetate, propionate, pivalate or isobutyrate.

7. Process according to claim 1 when performed in a solvent.

8. Process according to claim 7 where the solvent is a paraffinic hydrocarbon.

9. Process according to claim 8 when the solvent is pentane, hexane or heptane.

References Cited

Bonati et al., J. Chem. Soc. 1964, pp. 3156–3160.
Bonati et al., La Chimica e L'industries, 46 (1964) pp. 1339–1341.

JAMES E. POER, Primary Examiner
A. P. DEMERS, Assistant Examiner

U.S. Cl. X.R.
252—431 R; 260—429 R, 604 HF